Sept. 27, 1955 H. HORNBRUCH ET AL 2,719,293
RECORDER
Filed April 2, 1953 4 Sheets-Sheet 1

HUGO HORNBRUCH
HARRY C. BARTLEY
HUBERT FLINN
INVENTORS

BY
ATTORNEYS

Sept. 27, 1955 H. HORNBRUCH ET AL 2,719,293
RECORDER
Filed April 2, 1953 4 Sheets-Sheet 2
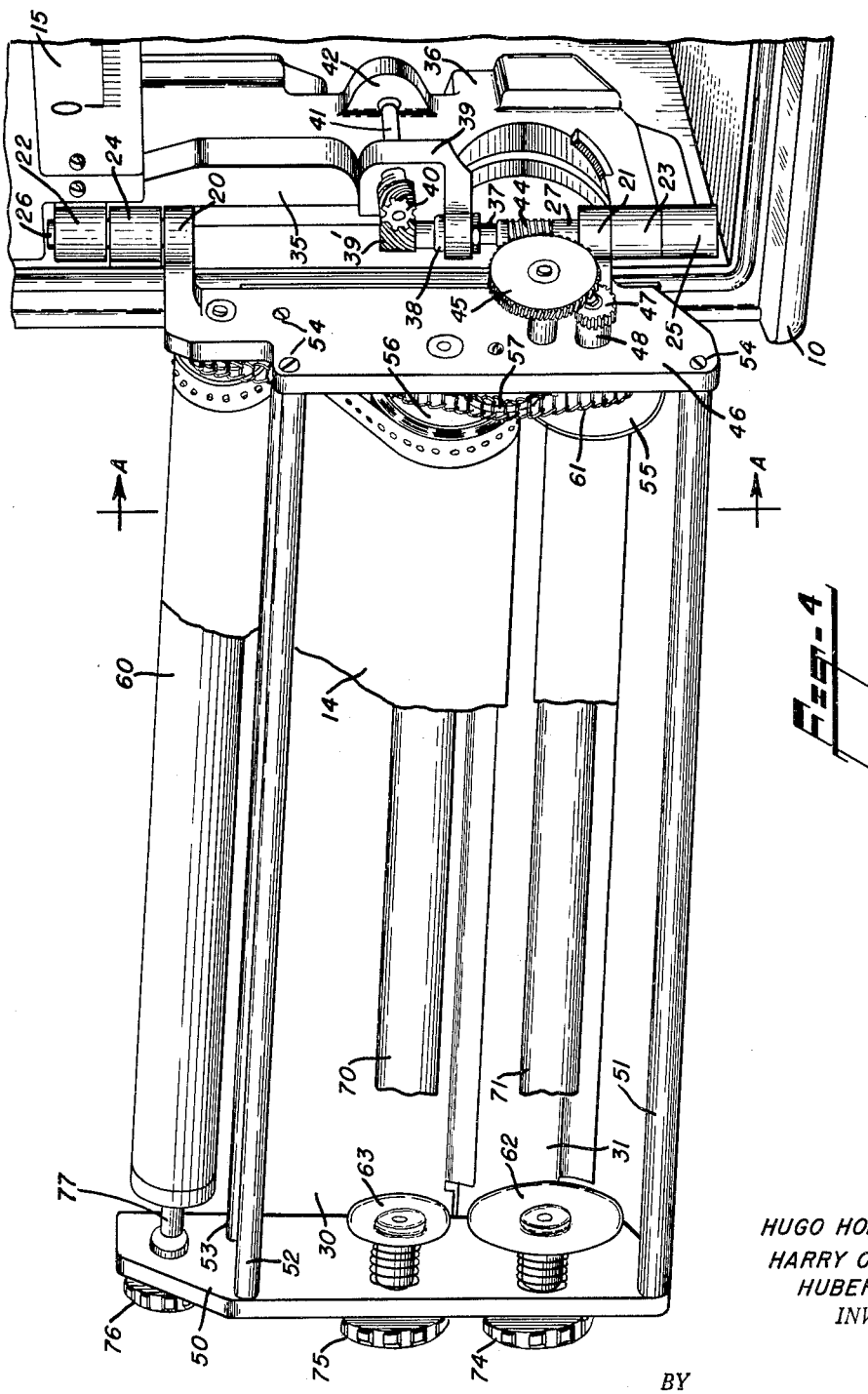
HUGO HORNBRUCH
HARRY C. BARTLEY
HUBERT FLINN
INVENTORS
BY
ATTORNEYS

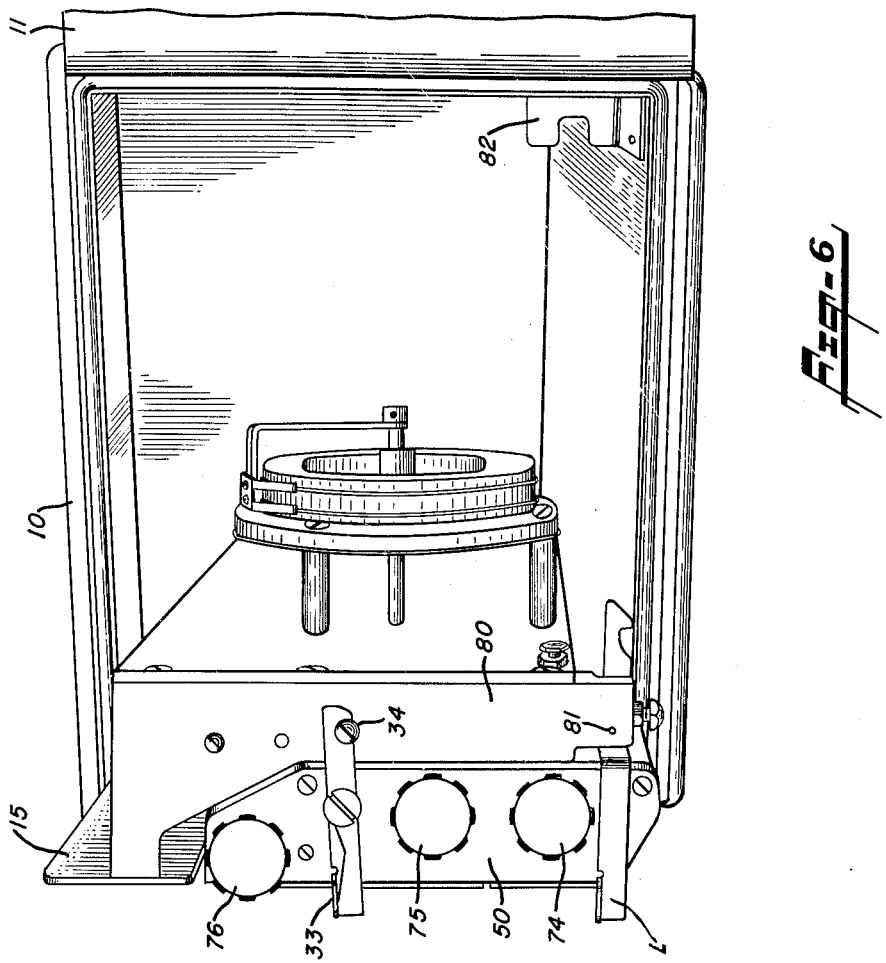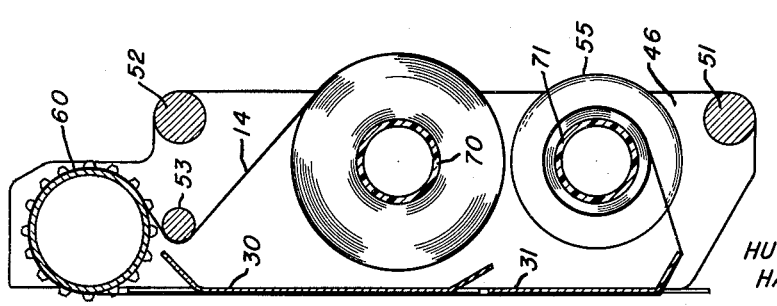

Sept. 27, 1955  H. HORNBRUCH ET AL  2,719,293
RECORDER
Filed April 2, 1953  4 Sheets-Sheet 4

HUGO HORNBRUCH
HARRY C. BARTLEY
HUBERT FLINN
INVENTORS

BY
ATTORNEYS

United States Patent Office 2,719,293
Patented Sept. 27, 1955

2,719,293

RECORDER

Hugo Hornbruch, Port-au-Peck, and Harry C. Bartley, West Orange, N. J., and Hubert Flinn, New York, N. Y., assignors to Weston Electrical Instrument Corporation, Newark, N. J., a corporation of New Jersey Application April 2, 1953, Serial No. 346,378

2 Claims. (Cl. 346—145)

This invention relates to measuring instruments and more particularly to improvements in potentiometric measuring and recording instruments having a strip chart.

Strip chart recorders of the type to which this invention relates are useful in providing a measurement and record of variable conditions such as, for example, temperature. The indication and recording of the instantaneous state of the variable condition usually is accomplished by electrical networks which are adapted to be unbalanced by a variation in the condition and to effect the operation of a suitable rebalancing arrangement. Such rebalance operations include the actuation of suitable power means for simultaneously moving an inking pen over the movable, calibrated chart. The mechanism carrying the pen also carries a pointer which cooperates with a stationary, calibrated scale.

Such potentiometric recorders of the automatic balancing type have been available for many years and while affording a more or less satisfactory service the present devices fall short of the most desirable form particularly from the standpoint of construction, operation and maintenance. In general, a strip chart recorder should be of simple but rugged construction, should have approximately 8 inches of the chart visible, should permit of ready installation and removal of the chart, should afford ready access to the re-rolled chart for general inspection, and should permit of access to all operating components without effecting the tracking or timing of the chart.

It is an object of this invention to provide a potentiometric recorder involving numerous improvements in certain individual parts and their cooperative arrangement thereby to provide a device having the desirable features above-stated.

An object of this invention is the provision of a recorder including a novel construction of the chart frame and the main frame whereby these members are selectively movable relative to each other and to the recorder housing without affecting the timing and tracking of the chart or the operation of the recorder as a whole.

An object of this invention is the provision of a novel chart frame for a recorder whereby the chart may be installed, removed or inspected with maximum facility.

These and other more specific objects and advantages will become apparent from the following description when taken with the accompanying drawings illustrating a recorder constructed in accordance with this invention. It is to be understood that the drawings are for purposes of illustration and are not to be construed as defining the scope or limits of the invention, reference being had for the latter purpose to the appended claims.

In the drawings wherein like reference characters denote like parts in the several views:

Figure 4 is a fragmentary view, drawn to an enlarged scale, and showing the chart frame swung to the fully open position, and with certain parts broken away for purposes of description;

Figure 5 is a vertical section taken along the line A—A of Figure 4 to show the path of travel of the chart from the supply roll to the re-roll;

Figure 6 is a front view showing the chart frame and the main frame swung as a unit to the partially open position.

Figure 1:
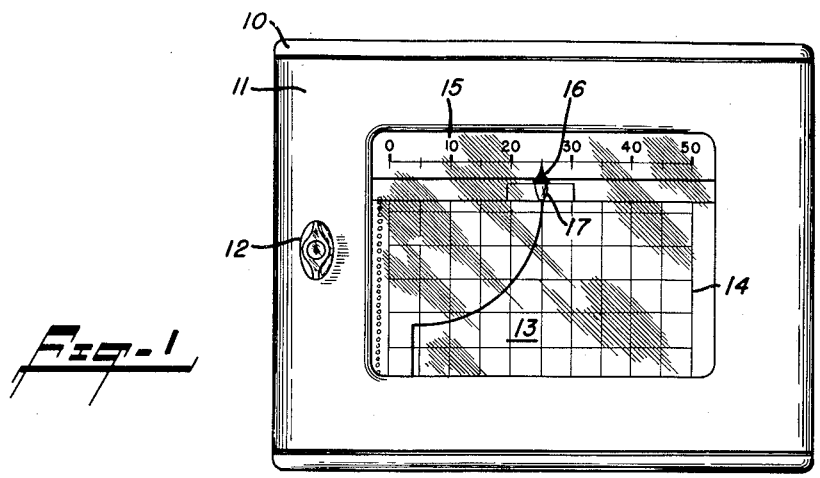
Figure 1 is a front view of a potentiometric recorder made in accordance with this invention.

As shown in Figure 1, the recorder is housed within a case 10 that includes a front door 11 provided with a suitable combination latch and lock 12. The door is provided with a substantially rectangular window 13. Visible through the window are the calibrated chart 14, a stationary, calibrated scale 15 and a portion of the pen carriage mechanism including the pointer 16 and the inking pen 17. Those skilled in this art will understand that in a pyrometer recorder the pen carriage mechanism is moved to the left or right in accordance with changes in the temperature being measured so that the position of the pointer relative to the scale will indicate the instantaneous value of temperature, in terms of millivolts, or degrees, and the pen will record the corresponding value on the calibrated chart.

Figure 2:
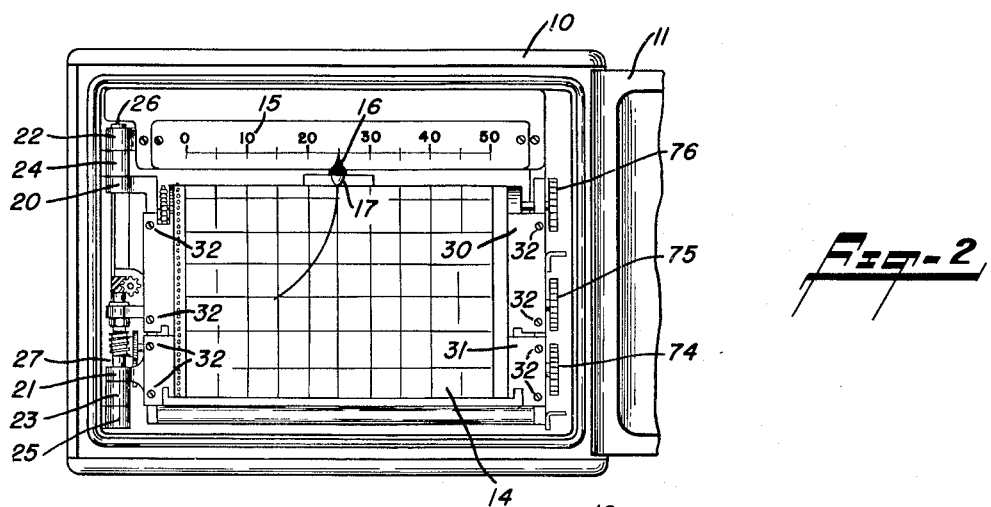
Figure 2 is a similar view with the door in the open position.

Reference is now made to Figure 2 which is similar to Figure 1 but with the door 11 in the open position. For purposes of immediate description it may here be pointed out that the calibrated chart 14, and all associated rollers and driving mechanism, are carried by a chart frame having integral spaced lugs 20, 21. On the other hand the scale 15 and the pen carriage mechanism with its associated driving mechanism are carried by a separate main frame having the integral, spaced lugs 22, 23. A supporting bracket, having the spaced lugs 24, 25, is secured in fixed position within the case. It will be noted that all these lugs are in vertical alinement. The upper lugs 20, 22 and 24 include alined holes which accommodate the upper hinge pin 26 with a small amount of clearance. The lower lug 25, of the fixed bracket, is provided with a vertical bore for accommodation of the lower hinge pin 27 which passes through alined clearance holes in the cooperating lugs 21 and 23. Inasmuch as the hinge pins are in alinement it will be apparent that the chart frame and the main frame are pivotally hinged for independent rotational movement relative to each other and to the instrument case.

In operation, the chart is moved downwardly, either continuously or intermittently but at a constant rate, over the upper chart plate 30 and the lower chart plate 31, which plates are removably secured to the chart frame by the screws 32. It is highly desirable that such chart movement continue without interruption when the chart frame is swung open relative to the main frame, or relative to the case, thereby maintaining accurate chart timing at all times. Toward this end, power for driving the chart is transmitted to the chart frame through suitable gearing as will be described in detail with reference to Figure 4.

Figure 3:
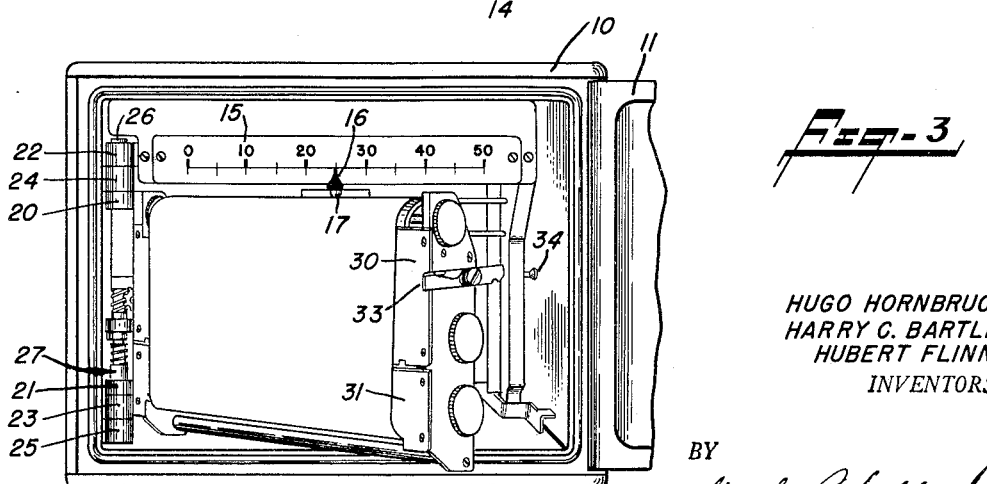
Figure 3 is similar to Figure 2 and showing the chart frame swung to the partially open position.

In Figure 3 the chart frame is shown in the partially opened position. This chart frame normally is locked in proper position relative to the main frame by means of a finger-operable, spring-biased latch 33 which includes a notch for engaging a headed stud 34 that is secured to the side of the main frame.

Reference is now made to Figure 4 which shows the chart frame swung to the fully-opened position. This view shows a portion of the supporting bracket 35 which is secured to the side wall of the case 10 and which includes the integral spaced lugs 24 and 25. Also shown is a portion of the main frame 36 which includes the integral lugs 22 and 23. As described hereinabove, the upper hinge pin 26 passes through alined holes in the associated lugs 20, 22 and 24. The lower hinge pin 27 passes through alined holes in the associated lugs 21 and 23 and into a bore in the lug 25. It will be apparent that the weight of the chart frame and the main frame is carried by the bottom lug 25 of the supporting bracket 35. The lower hinge pin 27 is provided with a bore within which is seated the lower end of a shaft 37, said shaft passing through a bearing 38 that is carried by the lug 39, the latter being an integral part of the casting forming the main frame 36. A spiral gear 39' is secured to the upper end of the shaft 37 and cooperates with the spiral gear 40, the latter being secured to the shaft 41. The shaft 41, supported by suitable bearings within the lug 39 and the lug 42, constitutes the drive shaft and may be directly coupled to an electric motor through suitable reduction gears or through a suitable intermittently-operating linkage, as is well known in this art. A worm 44 is secured to the central portion of the shaft 37 and cooperates with the worm gear 45 pivotally carried by the end plate 46 of the chart frame. It will now be clear that rotation of the power shaft 41 produces a rotation of the worm 44, through the medium of the spiral gears 39', 40 and the shaft 37, and that rotation of the worm 44 produces rotation of the gear 45. The gear 45 is coupled to a gear 47, by means of a pinion gear (not visible in the particular view of Figure 4) which gear 47 is secured to a shaft passing through the bearing 48 carried by the frame end 46. It is here pointed out that the worm 44 and gear 45 remain in mesh for all angular positions of the chart frame and, likewise, the spiral gears 39' and 40 remain in mesh for all angular positions of the main frame 36 which carries the motor providing rotation of the drive shaft 41. Consequently, the chart frame and/or the main frame can be rotated about the alined hinge pins 26 and 27 without interrupting the transmission of power to the gear 47, thereby maintaining proper timing of the chart, as will be further explained, below.

We pass now to a detailed description of the chart frame, with continued reference to Figure 4. Such chart frame comprises the sturdy ends 46 and 50, the cross bars 51, 52 and 53 which are secured rigidly to the ends as by the screws 54, and the upper chart plate 30 and the lower chart plate 31. The frame end 46 carries the disc 55, which is secured to the same shaft as the gear 47, a similarly rotatably-mounted disc 56, and an idler disc 57. A drive roll 60 is rotatably mounted between the frame ends and includes radially-extending pins adapted to enter into the spaced holes formed along one edge of the chart 14, in accordance with conventional practice. Also in accordance with conventional practice, the drive roll 60 is provided with a sprocket gear that is frictionally coupled to the roll. Thus, rotation of the gear 47 results in a direct rotation of the disc 55 and a corresponding rotation of the drive roll 60 through the medium of the drive chain 61.

The frame end 50 carries the freely-rotatable discs 62 and 63, alined with the similar discs 55 and 56, respectively, carried by the end 46. These discs are provided with central hubs adapted to fit within the ends of fibre tubes, such as the tube 70, generally referred to as the supply roll in that it carries the unused portion of the chart, and the tube 71 generally referred to as the re-roll. It may here be pointed out that the discs 62 and 63 are spring-backed and provided with convenient knobs 74, 75, in accordance with conventional practice, to facilitate insertion of the fibre tubes into position. It will be apparent that the pivotal mounting of the chart frame, whereby the frame may be swung outwardly substantially 180 degrees, permits ready access to the entire mechanism associated with the chart thereby facilitating the insertion and removal of both the supply roll and the re-roll and the threading of the chart over the various rolls and bars. Further, when the chart frame is swung to the open position, full access is had to the pen carriage mechanism, and other mechanisms, carried by the front portion of the main frame. Thus, refilling the ink reservoir, and other adjustments or maintenance operations, can be carried out without loss of chart timing, continuous movement of the chart being accomplished by the spiral and worm gears, already described. A knob 76 is secured to drive-roll shaft 77 and is used to advance or roll-back the chart as desired.

Reference is now made to Figure 5 which is a vertical sectional view taken along the line A—A of Figure 4 and which is presented to show the actual threading of the chart 14 in operating position. The chart supply roll is carried by the fibre tube 70 and the leading end of the chart is passed under the guide rod 53, over the drive roll 60, downwardly along the upper and lower chart plates 30, 31, and on to the fibre re-roll tube 71. The simplicity of the chart-threading operation is apparent.

As described, above, the main frame is also pivotally-mounted for rotation outwardly of the recorder case. As shown in Figure 6, the chart frame (which includes the frame end 50) is shown latched in operating position relative to the main frame (which includes the frame end 80) by the spring-biased latch 33 and the cooperating, headed-stud 34. Both members, that is, the chart frame and the main frame, are shown swung, as a unit, outwardly of the case approximately 90 degrees for purpose of description although it will be clear that such unit can be rotated approximately 180 degrees. The main frame carries numerous components such as, for example, the slide wire 81 of the potentiometer, which components, per se, form no part of the present invention and, therefore, are not shown in detail. Further, the electric motor which drives the chart is also carried on the back of the main frame, said motor rotating the drive shaft 41, see Figure 4. In Figure 6 we have omitted the usual components, such as the amplifier, batteries, etc., which normally are disposed inside the recorder case. However, it is desirable to call attention to the fact that a second electric motor is also carried on the back of the main frame, said motor being controlled by the amplifier to rotate in one direction or the other and to impart a corresponding rotation to the potentiometer slider thereby to maintain a balance in the electrical circuit. By means of a suitable linkage such rotation of the potentiometer slider is converted to a corresponding linear movement of the pen carriage mechanism thereby providing an indication of the instantaneous value of the condition being measured and a corresponding record on the chart. Electrical connections between those components carried by the main frame and those disposed inside the recorder case, are made by means of a suitable, flexible cable arranged to permit rotation of the main frame to the fully-opened position. Inasmuch as the two electric motors, the slide wire potentiometer, the pen carriage mechanism and all cooperating components are carried by the main frame, such main frame can be swung to any desired position without interrupting the operation of the recorder as a whole.

The main frame is secured in the closed position relative to the recorder case by means of a finger-operable, spring-biased latch L which is pivotally secured to the frame end 80 by the pin 81 and which includes a notch for engagement with the fixed stop 82.

Figure 7:
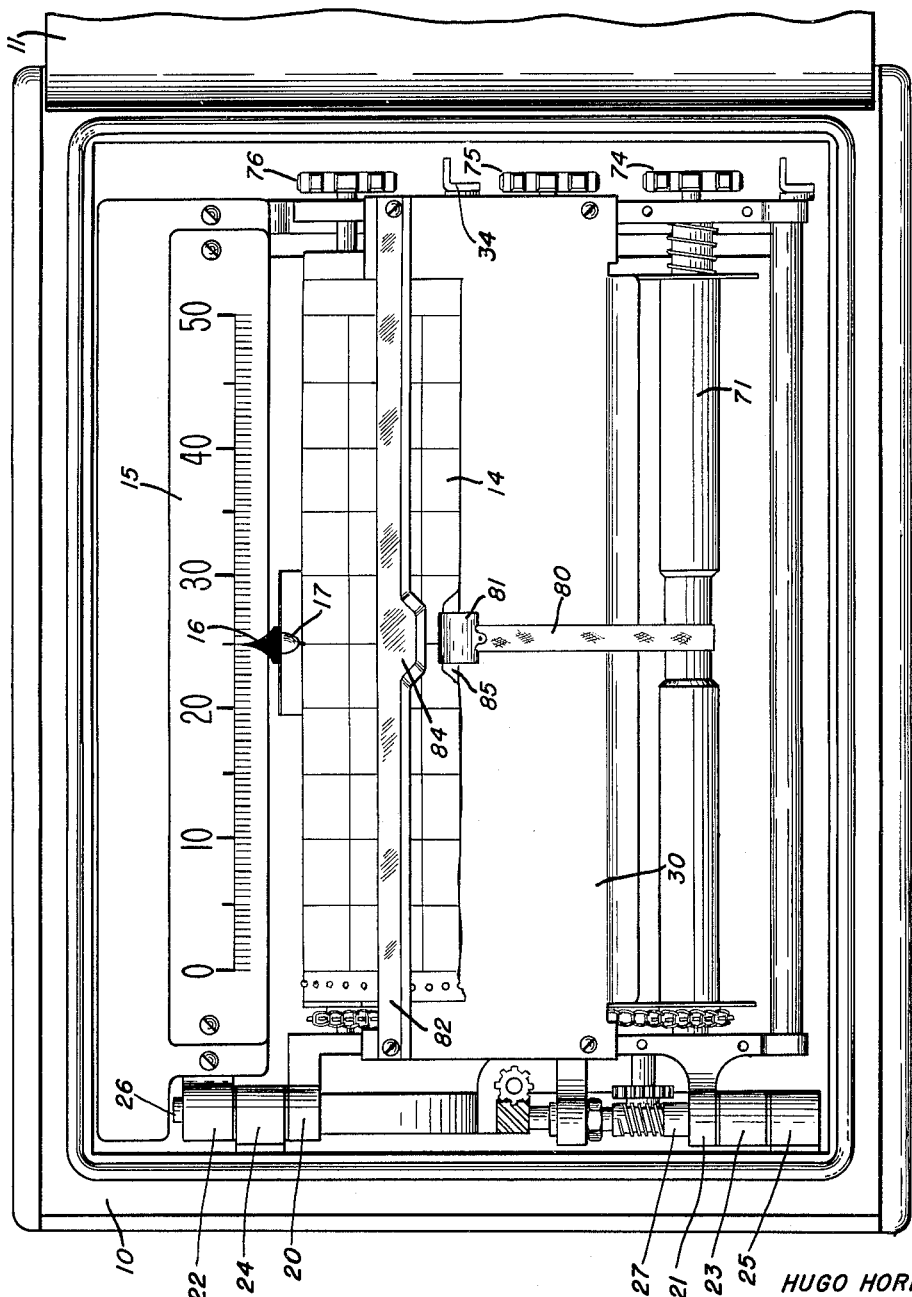
Figure 7 is similar to Figure 2 but showing the lower chart plate removed (thereby affording access to the re-roll) and including the daily tear-off feature.

Reference is now made to Figure 7 which is similar to Figure 2 except for certain differences now to be described. In many applications it is desirable to tear off daily chart records for analysis and filing. A recorder constructed in accordance with our invention can be modified for this purpose quickly and conveniently by the user. As shown in Figure 7 the lower chart plate 31, see also Figure 2, is removed thereby exposing the fibre re-roll tube 71 for access from the front of the instrument and without swinging open the chart frame. One end of a flexible tape 80 is secured to the re-roll tube 71, as by adhesive tape, and the other end of the tape is provided with a clip 81. A tear-off bar 82, which may be made of a transparent plastic in order not to obstruct the underlying record, is attached to the upper chart plate 30 by the two screws, as shown. Such tear-off bar is spaced from the chart 14 by suitable washers and preferably includes an extended, central portion 84. When the clip 81 is attached to the end of the chart, the chart will be drawn downwardly and around the re-roll tube 71. After a 24 hour run, the operator unwinds that portion of the chart encircling the re-roll tube, disconnects the clip 81 and, with an outward and lateral movement, tears the chart along the lower edge of the tear-off bar 82. The recorder continues in normal operation and after a short period of time the lower edge of the chart will extend below the bar 82 a sufficient distance to permit attachment of the clip thereto, as shown in the drawing, whereupon the instrument is conditioned to provide another daily record. The tape and clip arrangement eliminates the necessity of drawing the chart down around the re-roll tube thereby simplifying this particular operation and reducing chart waste to a minimum. The extended portion 84, of the tear-off bar 82, results in a lip formed on the upper chart portion after the desired record is torn off. Such lip 85 is folded back along the chart to provide a double thickness of the chart paper at the point of attachment of the clip.

Having now described our invention the features of a recorder constructed in accordance therewith may be summarized as follows.

1. The structural components are of straight-forward, rugged design promoting economy of manufacture and long operating life with a minimum of maintenance.

2. The pivotally-mounted chart frame carries all components associated with the chart and affords ready access to the entire chart thereby facilitating chart installation and removal.

3. The pivotally-mounted main frame carries the pen carriage mechanism (including the pen, ink reservoir and indicating pointer) the potentiometer slider and the electric motors for operating the chart drive, the potentiometer slider and the pen carriage. Consequently these components are made readily accessible for adjustment, serving, etc.

4. The chart frame and the main frame are pivoted on a common axis whereby each or both may be rotated without disrupting the operation of the recorder and, particularly, the timing of the chart.

5. The pivoted arrangement of the two frames affords unobstructed access to the entire inside of the instrument case thereby facilitating such operations as may be necessary with respect to those components disposed within the case.

6. The removable lower plate on the front of the chart frame permits incorporation of the daily tear-off feature with a minimum amount of modification.

Those skilled in this art will realize that in any arrangement wherein the chart is subject to movement into and out of contact with the pen it is desirable to provide some means to prevent damage to the pen and/or to the chart. Various elaborate arrangements have been proposed for this purpose. The recorder herein described is provided with a simple, novel pen-lifting arrangement disclosed in United States application Serial No. 288,898, filed May 20, 1952, by Harry H. Bartley and Ernst Umrath, and entitled, Recording Apparatus by Harry C. Bartley and Ernst Umrath, now Patent No. 2,673,138, issued March 23, 1954, and entitled "Marker For Recording Apparatus."

What we desire to protect by Letters Patent of the United States is set forth in the following claims.

We claim:

1. In a strip chart recorder the combination of a case; a supporting bracket secured within the case and including upper and lower spaced lugs each having opposed flat surfaces; a main frame including upper and lower spaced lugs each having opposed flat surfaces, said main frame lugs resting on the bracket lugs; a chart frame including integral upper and lower lugs each having opposed flat surfaces, the lower chart frame lug resting on the lower main frame lug and the upper chart frame lug being disposed below the upper bracket lug; an upper hinge pin passing through alined holes in the three upper lugs; an alined lower hinge pin having an end disposed within a bore in the lower bracket lug and extending through alined holes in the other two lower lugs; a first spiral gear and worm secured to the lower hinge pin; a worm gear carried by the chart frame and in mesh with the said worm; and a second spiral gear carried by the main frame and in mesh with the said first spiral gear; the recited arrangement being such that the chart frame is subject only to pivotal rotation in a plane normal to the axis of the hinge pins and the meshed gears maintain contact in fixed planes normal to the axis of the hinge pins throughout all relative pivotal movement of the cooperating lugs.

2. The invention as recited in claim 1 including a chart-drive roll and a re-roll carried by the chart frame; a first plate spanning the front of the chart frame and overlying the chart-drive roll; a second plate spanning the front of the chart frame and removably secured thereto, said second plate overlying the re-roll and the two plates forming a relatively-flat surface to support the chart between the chart-drive roll and re-roll.

References Cited in the file of this patent

UNITED STATES PATENTS

| | | |
|---|---|---|
| 1,564,519 | Brown | Dec. 8, 1925 |
| 2,074,118 | Ross et al. | Mar. 16, 1937 |